Dec. 24, 1968     L. J. RACKLIFFE ET AL     3,418,455

MATCHED MAILING DETECTION SYSTEM

Filed March 5, 1964     7 Sheets-Sheet 1

FIG. 1

INVENTORS
L. J. RACKLIFFE
R. G. RAU

By Robert B. Brodie
ATTORNEY

FIG-3
CARD READING CIRCUIT

FIG-4
BILL READING - RIGHT STATION

FIG-5
FAILURE INDICATING CIRCUIT

FIG-6
CHECKING CIRCUIT

FIG. 9

United States Patent Office 3,418,455
Patented Dec. 24, 1968

3,418,455
MATCHED MAILING DETECTION SYSTEM
Leroy J. Rackliffe, Cheshire, and Rodney G. Rau, North Branford, Conn., assignors to American Telephone and Telegraph Company, New York, N.Y., a corporation of New York
Filed Mar. 5, 1964, Ser. No. 349,584
6 Claims. (Cl. 235—61.7)

ABSTRACT OF THE DISCLOSURE

Two different types of indicia carrying inserts, which are to be paired and inserted into an envelope, are successively withdrawn from respective stacks of inserts and directed to pass separate sensing stations. Information indicative of the indicia on successive inserts in one stack is stored alternately in one or another of a pair of storage circuits and compared with the indicia sensed on inserts from the other stack. The information which is stored and compared corresponds to an insert which was withdrawn on the cycle immediately preceding the one on which the insert with which it is directly compared was withdrawn. If the stored information and the indicia on the compared insert are found to be identical, the inserts are stuffed into an envelope. If the comparison indicates that the indicia are not identical, the machine is stopped and an alarm is sounded.

---

This invention relates to improvements in the method and apparatus for placing inserts into ordinary business envelopes.

Envelope insert machines are well-known to the art. Such machines mechanically extract inserts, usually arranged in separately stacked decks, placing such extracted inserts into respective envelopes. One type of envelope insert machine comprises a plurality of insert decks disposed about the longitudinal extent of a unidirectionally moving conveyor belt, apparatus for extracting individual and corresponding inserts from the separately stacked decks during the first cycle, subsequently depositing the extracted inserts upon the conveyor belt in spaced relation, and apparatus for placing the deposited inserts into individual envelopes from the conveyor belt. Significantly, an insert drawn from a first deck during a first cycle is positioned by the conveyor belt such that an insert drawn from a second deck during the next successive cycle will be deposited thereon.

Insert machines of the type described find use in high-volume billing operations. In one such operation each customer bill together with a separate return payment card is inserted into an individual envelope. This requires assurance that separate inserts correspond with each other.

Typically, customer bills, return payment cards, and other inserts are processed on separate automatic card processing machinery well-known to the art. Illustratively, such card or insert machinery is shown and described in U.S. Patents 2,610,737 and 2,661,841. Characteristically, card processing machinery includes apparatus for checking the intra-group and inter-group sequence of the processed inserts. Examples of intra-group sequence are inserts arranged alphabetically, or, by a monotonically increasing or decreasing series of numbers.

In summary, it is possible to assure a correspondence of individual inserts in separate decks or sequences prior to such insert decks being loaded into envelope insert machines. The problem then is to assure that no errors are made by the insert machine itself as it extracts the cards or inserts and loads them into corresponding envelopes.

The above-described envelope insert machines include thickness detectors attached to their extracting apparatus. Since individual inserts from individual decks are extracted, usually a single insert at a time, the machine should advantageously be stopped when two inserts are accidentally extracted from the same deck. Otherwise, the entire subsequent sequence of inserts of that deck is out of phase with the insert sequence of the other decks.

Another approach to assuring correspondence is through the use of visual markings on selected inserts evenly spaced throughout the deck such that a marked insert extracted from a first deck should at one and the same time be simultaneously extracted with a marked insert from the second deck. However, such insert markings cannot assure the correspondence of all inserts interstitially spaced.

Accordingly, it is an object of this invention to provide an envelope insert stuffing machine with a mechanism for assuring the proper phase relation between individual inserts extracted from individual insert decks.

It is another object of this invention to inhibit envelope stuffing machine operation when more than one insert or no insert is extracted from its corresponding deck during any one machine cycle.

It is still another object of this invention to provide a simple electrical mechanism eliminating mechanical thickness detectors.

In one embodiment individual insert decks, prior to placement in the envelope insert stuffing machine, have their respective sequences coded with recurrent patterns of indicia. As one illustration, a first insert of a deck could be punched with one hole, the second insert with two holes, etc. Alternatively, a first insert could be punched with a hole in a first position, a second insert with one hole in a second position, a third insert with one hole in each of the first and second positions, etc. Each of the coded decks is respectively placed in spaced positions along the longitudinal extent of the conveyor belt. A sensing device comprising brushes for completing electric circuits is positioned such as to record the presence or absence of the coded indicia as the inserts are being extracted.

This invention contemplates the use of a plurality of sensing devices individually corresponding to individual stacked decks connected to a logic arrangement responsive to the sensed indicia for ascertaining the noncorrespondence between extracted inserts, and a machine interrupt circuit responsive to a noncorrespondent signal derived from the logic arrangement.

The logic arrangement stores and compares the sensed indicia. It can take the form of a relay circuit whose contact closure conditions represent the sensed indicia and a relay comparator.

The foregoing objects and aspects of the invention will be apparent from the following description of the specific embodiment of the invention which refers to the drawings wherein:

FIG. 9 is an exploded view of two insert decks illustrating the recurrent patterns of indicia and relative phase relationship between inserts in each deck.

Figure 1:
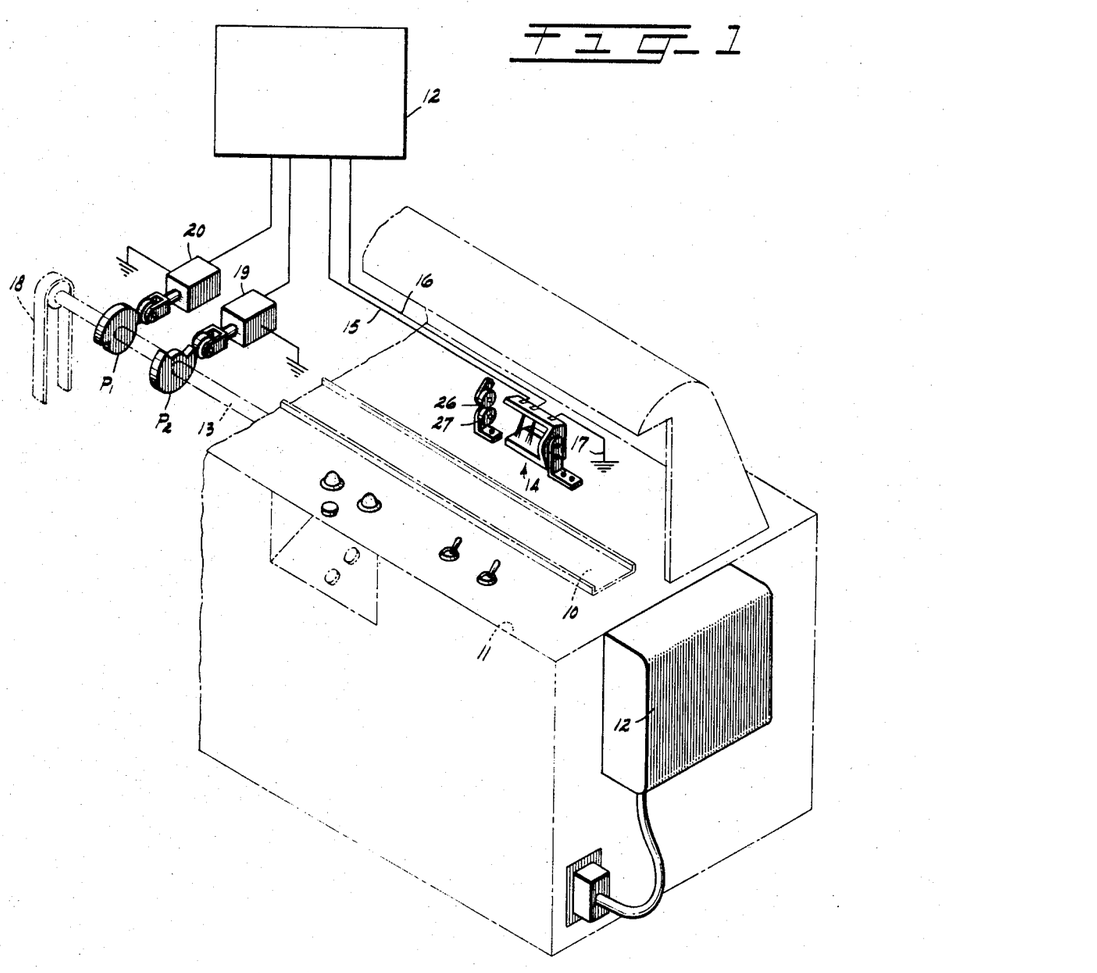
FIG. 1 is a cut-away isometric view of a portion of the envelope insert and stuffing machine.

FIG. 1 is a cut-away isometric view showing a portion of the envelope insert stuffing machine. Also shown is a unidirectionally moving conveyor belt 10 mounted on a horizontal surface 11. On the right hand side of the machine is the mechanically supported control box 12 containing the logic arrangement and machine interrupt circuits. The left hand portion of the drawing illustrates the use of a main drive shaft 13 of the machine having two cams P1 and P2 mounted thereon, which cams form the basic two-cycle timing circuit. Also included is an insert reading station 14 having brush sensors and a grounding plate 17. The cams P1 and P2 mechanically interrupt the electric circuits in control box 12 through the medium of microswitches 20 and 19 respectively. It should be noted, that the brush sensors are connected to the control box 12 input via lines 15 and 16 respectively. The shaft 13 is rotatably driven through means 18. Apparatus for stacking and placing the inserts into the individual envelopes is not shown. However, such apparatus would appear towards the left portion of the diagram. The interaction between the successive cam positions and the circuit in the control box 12 will be discussed in greater detail in succeeding paragraphs.

Figure 2:
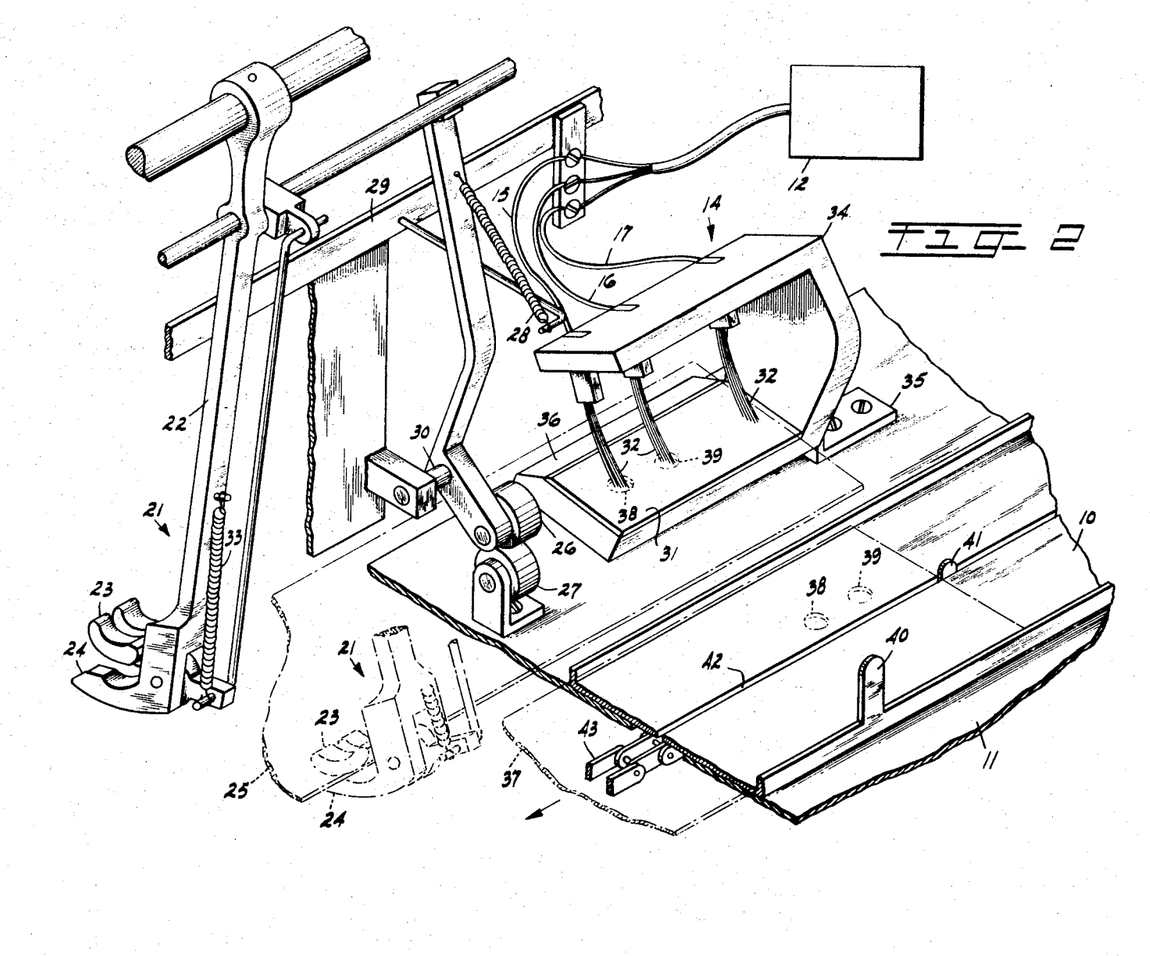
FIG. 2 is another cut-away isometric view of a reading station on said machine.

FIG. 2 shows a cut-away view of the reading station 14 and the extracting apparatus 21 mounted on the horizontal surface 11 of the machine. The insert extracting apparatus comprises a pivotably moving arm 22 having a spring-tensioned 33 pair of jaws 23, 24 adjusted to clamp onto the bottom insert 25 of a deck of inserts. The jaws draw the bottom insert through rollers 26, 27. Roller 27 is maintained in a fixed position, with roller 26 being operated by arm 22 and return spring 28 mounted to the bar 29 which is pivoted on member 30.

As is shown in FIG. 2, the reading station comprises an adjustable bracket 34 secured to the surface 11 through a fixed bracket 35 in longitudinally spaced relation to rollers 26, 27. Adjustable bracket 34 comprises a horizontal member which secures the grounding plate 31 and further possesses a beveled edge 36. The jaws 23, 24 grip the card or insert longitudinally and move it through the rollers 26 and 27 passing over the bevelled edge 36. This is conveniently shown in phantom position 25 of the figure. The sensing brushes 32 are shown in contact relation with the grounding plate 31. The positioning of the card or insert as illustrated in phantom position 25 interrupts the electric circuit contact of brushes 38, 39 and the grounding plate 31 depending upon the presence or absence of corresponding holes in the card. However, the third brush of the plurality 32, denominated the CP brush (see FIG. 3), is interrupted with the extraction of every card. It should be noted, that the brushes 32 are coupled to control box 12 through terminals 15 through 17 (see FIG. 1).

The second phantom position illustrated in FIG. 2 represents the position of the card after it has been extracted through the reading station and brushes and is deposited on conveyor belt 10. The card is secured upon the conveyor belt by stop 40 and is moved along the belt by pusher 41. Pusher 41 is guided through track 42 by chain driven means 43. The positions of the card and the pivotal jaws are shown in three discrete positions for diagrammatic purposes only. It should be understood that the actual extraction is performed in one continuous operation, the pivotal arm being repositioned as is shown in 21 of FIG. 2 subsequent to the card being deposited on track 10. It should be further understood, that the apparatus for extracting, sensing, and placing inserts upon the belt is substantially duplicated for all the reading stations.

FIGS. 3 through 7 show the logic and machine interrupt apparatus responsive to indicia sensed at the reading stations for ascertaining the correspondence between extracted inserts. The circuits shown are formed from a plurality of relays and for ease of description are portrayed in detached contact format. In this regard, FIGS. 8A and 8B are sequence charts showing the time sequence of the relay operating conditions. These charts should be used in conjunction with the description to assist the proper understanding of the detached contact format.

Figure 3:
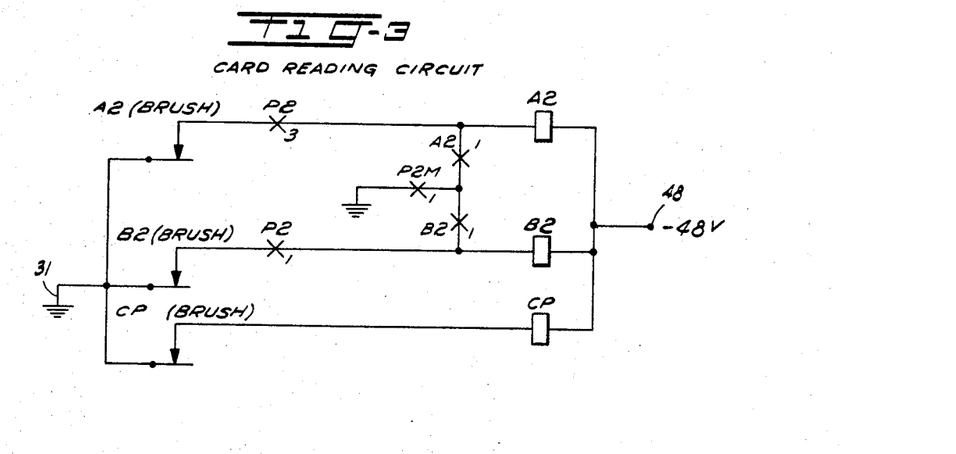
FIGS. 3 through 7 are relay circuit diagrams in detached contact form showing the sensing, logic, and machine interrupt circuits.
Figure 4:
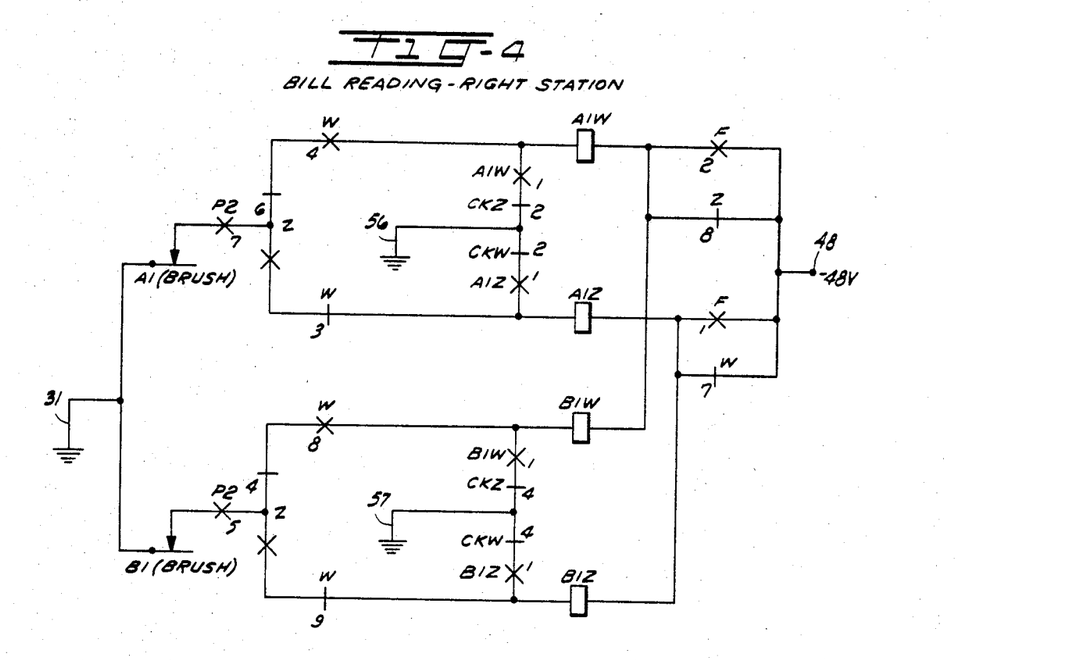

The envelope stuffing machine embodying the invention has two operating cycles respectively denominated W and Z. The time duration of these cycles is determined and controlled by the cams P1 and P2 operating through microswitches 20 and 19 respectively (see FIG. 1). The instant embodiment uses two reading stations, respectively, the "card reading" and "bill reading" station. It should be noted, that all portions of the relay circuits with the exception of the brush contacts and grounding plates in FIG. 3 and 4 are contained in control box 12.

The nomenclature describing the relay operating conditions as shown in the detached contact drawings uses a first number designating the contact, followed by the letter M or B indicating "make" or "break" and the relay designation. Accordingly, the designation "7MP2" references the 7th contact in a "make" or closed condition on the P2 relay. Likewise, the designation 5BCKZ references the 5th contact in a "break" or open condition on the CKZ relay.

In the following paragraphs the failure indicating circuit will be first discussed with additional comments referencing the control circuit in FIG. 7 and the nature of the two-cycle operation.

Figure 5:
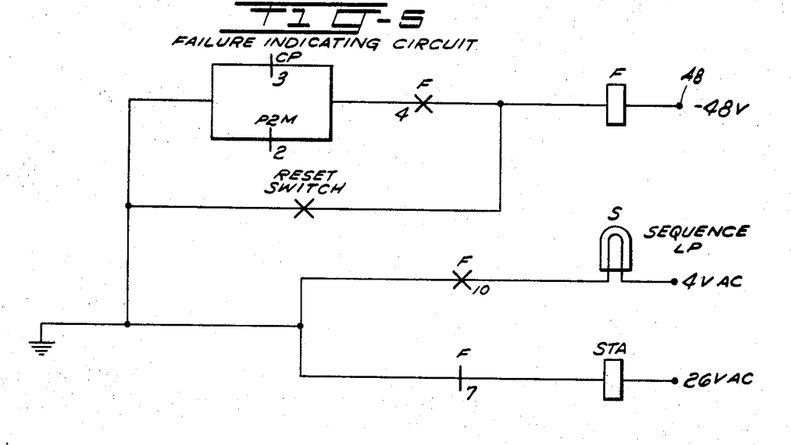

FIG. 5 represents the failure indicating circuit which starts or stops the machine and is controlled by the STA relay. The STA relay is in turn controlled by the failure indicating relay F. The F relay is operative when either the manually operated reset switch 44 is actuated or when there is a correspondence of indicia. Under these circumstances, contact 7 of the F relay open-circuits thereby opening the STA relay.

Referring to the card reading circuit shown in FIG. 3, it should be noted that the control relay CP is normally in the operated state. The CP relay releases when a card insert is presented for reading. The insert physically opens the CP brush to interrupt the CP operating path. The operated CP relay prevents the system from giving a false indication during the time interval when neither a card or bill is being sensed.

A card is read in the following manner (see FIG. 3): The A2 and B2 relays operate or release in response to the presence or absence of a hole in the card. The insert is moved between the A2 and the B2 brush contacts while the relay P2 of the control circuit (FIG. 7) is operated. The P2 relay operation is controlled by the P2 cam (see FIG. 7, control circuit). The reading of a bill shown in FIG. 4 is performed in two cycles (W and Z). The W and Z cycles are ultimately associated with the relay pairs A1W, B1W, and A1Z, B1Z. During the W cycle the bill is read with the information being stored in relays A1W, B1W. Simultaneously, card information presently read by the A2 and B2 relays is compared with bill information previously read and now stored in the A1Z and B1Z relays. In the Z cycle the bill information is read and stored in the A1Z and B1Z relays with comparison being performed by the information read by the A2 and B2 relays with the bill information read and stored in the A1W and the B1W relays.

Figure 6:
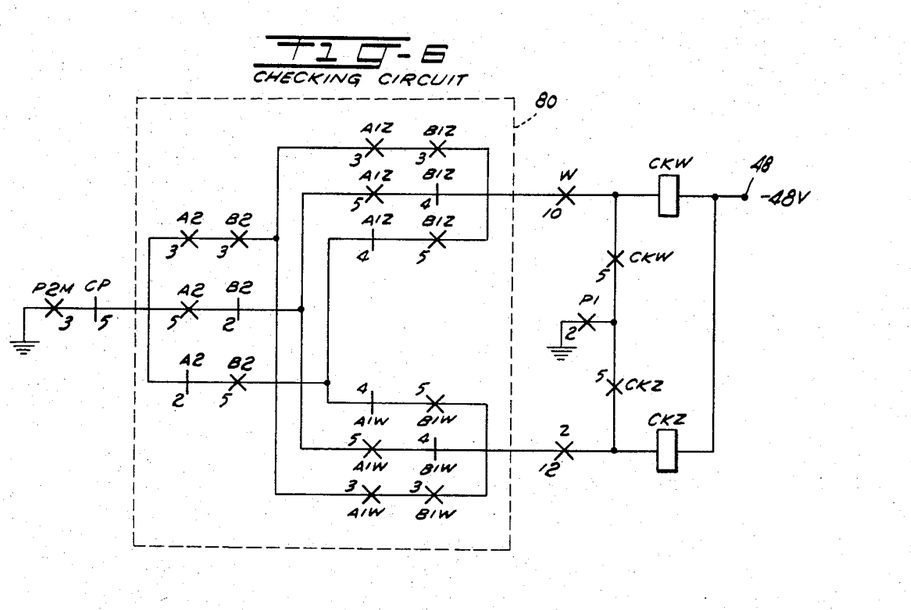
Figure 7:
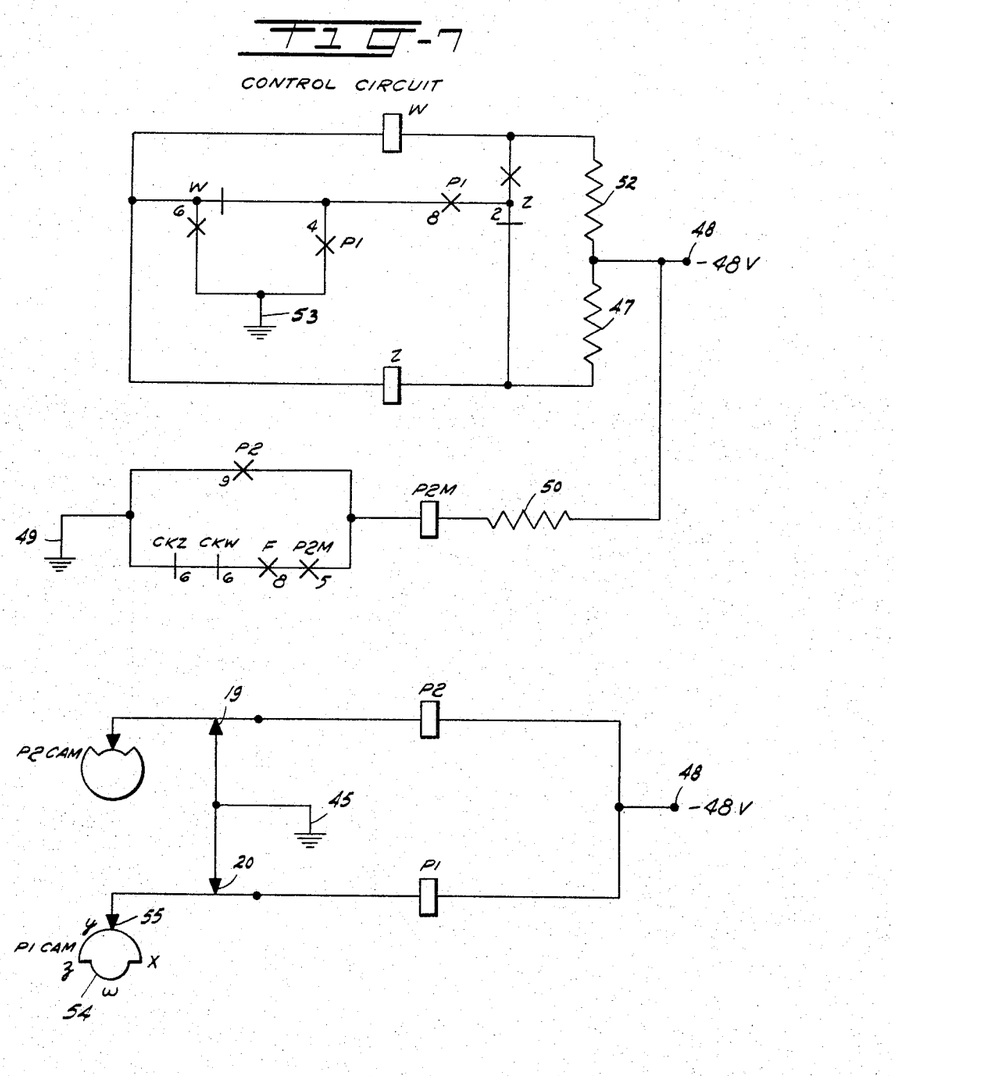
Figure 8:
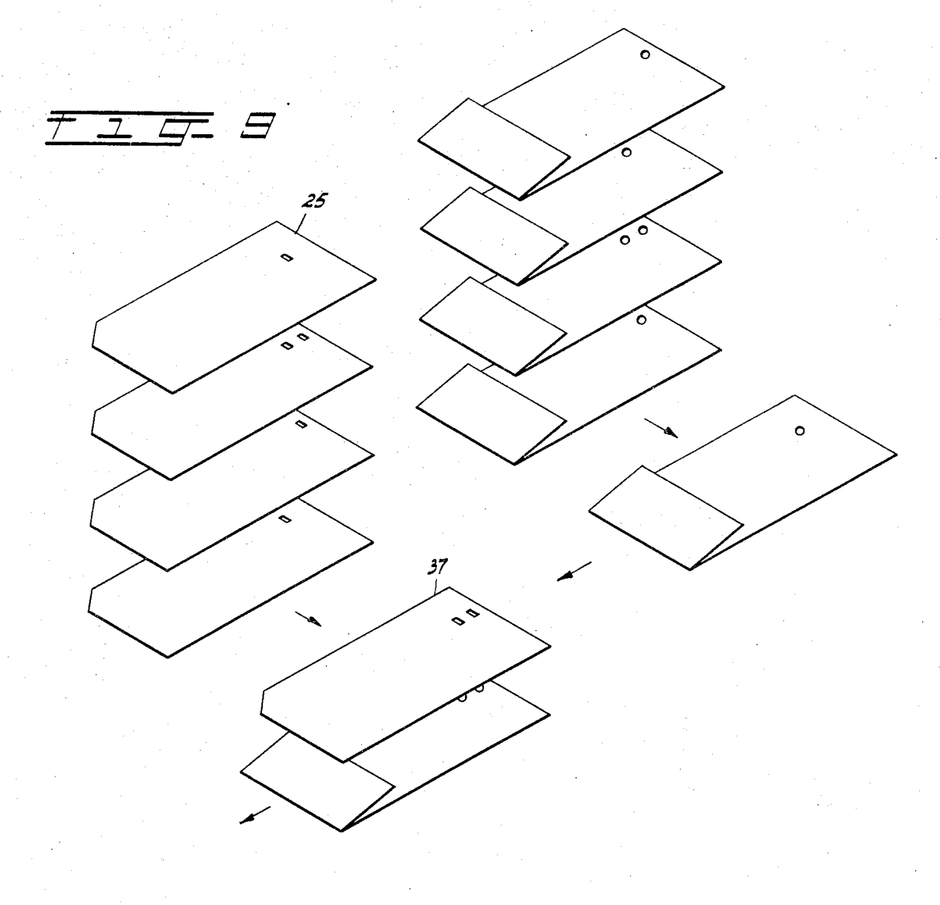
FIGS. 8A and 8B represent sequence diagrams showing the operating sequence of the sensing, logic, and machine interrupt circuits.
Figures 8A, 8B:
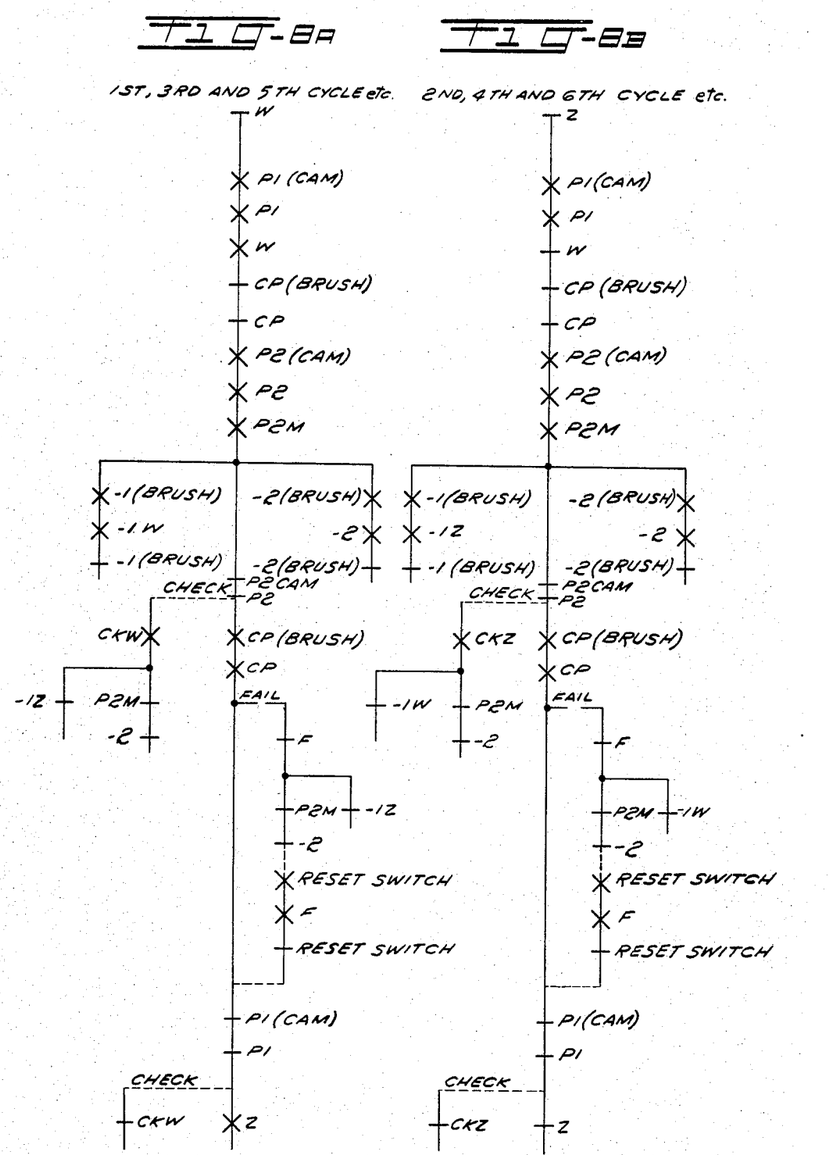

Referring to the control circuit FIG. 7, the timing cams P1 and P2 perform several control functions, which principally consist of the completion or release of operating paths associated with the different cycles. In FIG. 6, the CKW and the CKZ relay pairs operate in concert with the A1W, B1W; and the A1Z, B1Z relay pairs of the bill reading circuit shown in FIG. 4. These relay pairs are conditioned to operate alternately under the control of the W and Z relays of the circuit shown in FIG. 7.

When the machine starts to operate, the P1 and P2 cams rotate. The P1 cam closes contact 20 (FIG. 7) to provide a ground 45 for the voltage source 48 of the operating P1 (FIG. 7) relay. The operated P1 (FIG. 7) relay closes the 2MP1 (FIG. 6) contact, and operates the W (FIG. 7) relay over the operating path 52, 6BW, and the now closed 4MP1 contact between voltage source 48 and ground 53. The operated W (FIG. 7) relay initiates the W cycle by: First, closing its own 6MW (FIG. 7) contact to establish a self-locking path over the now closed 6MW (FIG. 7) relay contact between voltage source 48 and ground 53. Second, by the closing of the 4MW (FIG. 4) and the 8MW (FIG. 4) contacts of the bill reading circuit. This partially prepares the operating path for the A1W and the B1W (FIG. 4) relays. The W cycle is initiated by the closing of the 10MW (FIG. 6) contact in the checking circuits consequently preparing an operating path for the CKW relay (FIG. 6). Lastly, there are opened the operating paths of relays A1Z and B1Z (FIG. 4) by the opening of the 3BW and 9BW (FIG. 4) contacts. Since a card insert has not yet been presented to the CP brush contact (FIG. 3) for sensing, the relay CP (FIG. 3) remains operated. The CP brush contact (FIG. 3) opens only when a card is present in the card reading station.

It will now be assumed that the extracting apparatus of the enclosing machine simultaneously pulls the bottom card and the bottom bill out of their respective decks. Further, the card and the bill as they are pulled pass through their respective stations (FIGS. 3 and 4). The card enters the reading station, opens a CP brush contact thereby releasing the CP (FIG. 3) relay. The released CP relay supplements the previously described locking path for the F (FIG. 5) relay by closing the 3BCP (FIG. 5) contact and prepares the operating path for the CKW and CKZ (FIG. 6) relays by closing the 5BCP (FIG. 6) contact. After the card and the bill have been placed in their respective positions, the P2 (FIG. 7) cam assumes a rotational position as shown in FIG. 7. This closes contact 19 to operate the P2 relay thereby completing the operating path for the A2 and B2 relays by the closing of the 3MP2 and the 1MP2 (FIG. 3) contacts. This in turn prepares the operating path A1W, A1Z, B1W, and B1Z (FIG. 4) relays by closing the 5MP2 (FIG. 4) and 7MP2 contacts, and, lastly, closing the 9MP2 (FIG. 7) contact. This operates the P2M (FIG. 7) relays by the completion of the operating path from the voltage source 48 to the ground 49 via the resistor 50. The operated P2M relay provides: A self locking path via the now closed 5MP2M (FIG. 7) relay, 8MF contacts, 6BCKZ, and 6BCKW contacts (FIG. 7); also prepares a partial operating path for the CKW, CKZ (FIG. 6) relays by the closing of the 3MP2M contact in FIG. 6; lastly, by preparing the locking path for the A2 and B2 (FIG. 3) relays by closing the 1MP2M contact.

It will be further assumed that the bottom card and bill has two holes and that a second bill and card have only one hole punched in the left position as is shown in FIG. 9. The A2 and B2 brush contacts (FIG. 3) will close in response to the presence of the two holes in the card and their closure will complete the previously described and partially completed operating paths for the A2 and B2 relays. The A1 (FIG. 4) brush contact closure will complete the previously described operating paths for the A1W (FIG. 4) relay which will now be stored for the next cycle. Since the A1Z and B1Z (FIG. 6) relays are not operated, the CKW relay will not operate. It should be noted, that the inoperative condition of the CKW relay is controlled by the contact network 80 (FIG. 6) and relays A2, B2 A1Z, Z1Z, A1W, and B1W. Further, the operating path for either the CKW or the CKZ (FIG. 6) relays cannot be completed from the potential source 48 to ground without having selected ones of the previously-mentioned relays operative. Thus, the 6BCKW (FIG. 7) contact of the CKW relay will remain open. This will cause the P2M (FIG. 7) relay to remain operated and its 2BP2M (FIG. 5) contact to remain open with the F relay being released when the card leaves the card reading station. When the card leaves the reading station the CP brush contact recloses. The operative CP (FIG. 3) relay in turn opens the 3BCP contact releasing the F relay. The release of the F relay recloses the 7BF contact which in turn re-operates the STA (FIG. 5) relay. The released F relay in turn releases the P2M (FIG. 7) relay by re-opening the 8MF (FIG. 7) contact. Thus, the locking path for the A2 and B2 relays are opened. The machine may be restarted by reoperating reset switch 44. The above-described relay sequences form the W cycle. In the succeeding paragraphs the relay sequences operative during the Z cycle will be discussed.

For the Z cycle the machine may be considered as simultaneously pulling the next card and bill out of their respective decks. The brushes A2, B2 (FIG. 3) and A1, B1 (FIG. 4) sense the respective cards and bills. Further, it will be assumed that (a) third card and bill, as initially stacked, have additional holes only in the right position as is shown in FIG. 9, the second card and bill as initially stacked in their respective decks have additional holes punched only in the left position. It will be further assumed that the A1W and B1W (FIG. 4) relays have stored the "bill information" during the previous cycle, i.e., the A1W relay is operated while the B1W (FIG. 4) relay is not. Thus, the A2 and B2 brushes (FIG. 3) will sense the card with the hole in the left position. Thus, the A2 relay will operate with its operating path completed by the A2 (FIG. 3) brush contact through the now closed 3MP2 contacts. The A1 and B1 brushes (FIG. 3) will read the bill with only an additional hole in the right position. That is the A1Z relay will not operate since the A1 (FIG. 4) brush contact is not closed and the B1Z (FIG. 4) relay will operate with its operating path being completed from the potential source 48 to the ground 56 of the path 7BW, 9BW the now closed 4MC and 5MP2 contacts. The operated B1Z (FIG. 4) relay will lock to the ground 57 over its own now closed 1MB1Z and the 4BCKW (FIG. 4) contact.

As the P1 and P2 (FIG. 7) cams continue to rotate during the Z cycle, the logic arrangement will compare the presently sensed card information stored in the A2 and B2 (FIG. 3) relays with the previously sensed bill information stored in the A1W and B1W (FIG. 4) relays. The operation of the Z relay partially prepared an operating path for the CKZ (FIG. 6) relay by closing the normally open 12MZ (FIG. 6) contact. The operating path for the CKZ (FIG. 6) relay was further partially completed by the operation of the relay P2M (FIG. 7) in time sequences as described before in response to the further rotation of the P2 cam (FIG. 7). Thus, the CKZ (FIG. 6) relay is now conditioned to compare the presently read card information with the previously read bill information as reflected in the relay contact network 80 (FIG. 6). Inspection of the checking circuit or logic arrangement, FIG. 6, will reveal that the previously described partially completed operating path for the CKZ (FIG. 6) relay is now completed over the now closed 12MZ, 4BB1W, 5MA1W, 2BB2, 5MA2, 5BCP, and 2MP2M contacts. Operation of the CKZ (FIG. 6) relay interrupts the previously described holding path for the P2M (FIG. 7) relay by opening the 6BCKZ (FIG. 7) contact. The released P2M relay continues to hold the F relay operated by closing the 2BP2M (FIG. 5) contact. Thus, even though the 3BCP (FIG. 5) contact opens as the CP (FIG. 3) relay operates again, the continued operation of the F relay keeps the STA relay (FIG. 5) released by keeping the 7BF (FIG. 5) contact open. The continued operation of the STA relay permits the enclosing machine to continue its operation. It will be noted that during the Z cycle the CKW (FIG. 6) relay could not operate in response to the operation and release of relays A1W (FIG. 4) and B1W (FIG. 4) because the W relay was not operated which kept its 10MW (FIG. 7) contact open thereby keeping the operating path of the CKW relay open. During the W cycle, the 12MZ (FIG. 7) contact does the same for the CKZ (FIG. 6) relay.

Indication of noncorrespondence

Had a noncorrespondence occurred between the presently read card and the previously read bill, an inspection of the relay contact network 80 (FIG. 6) would reveal that the CKZ (FIG. 6) relay would not have been operated. Hence the operating path for the P2M (FIG. 7) relay would not have been interrupted and the F (FIG. 5) relay would have been released upon reopening the 3BCP (FIG. 5) contact in response to (a) the reoperation of CP (FIG. 3) relay as the card leaves the reading position and as the 2BP2M contact would have continued to be in the open state, (b) the releasing of the F (FIG. 5) relay with the reclosed 7BF (FIG. 5) contact which would have resulted in the STA relay (FIG. 5) being reoperated. Operation of the STA relay would have stopped the machine. The released F (FIG. 5) relay would have also opened the 10MF (FIG. 5) contact thereby opening the path for the sequence lamp S (FIG. 5) thus extinguishing the lighted lamp thereby indicating a mismatch in the collating operation of the machine.

Alternate operation of the W and Z cycles

Referring now to the control circuit, FIG. 7, the P1 cam and the P1 relay controls the cyclical operation of the W and Z relays which in turn control the W and the Z machine cycles. For each of the W and Z cycles, it takes one complete revolution of the P1 cam. As shown the cam contact 33 follows the surface of the cam X–Y–Z–W as the cam rotates one complete revolution clock-wise. Consider that the W cycle takes place while the P1 relay operates, the cam contact 33 traverses the X–Y–Z operation of the cam surface as the cam rotates. The operated P1 relay provides the operating path for the W relay over the path 52 and now closed 4MP1 contact between the voltage source 48 and ground 53. The Z relay does not operate at this time because the voltage source is shunted out from the relay by the ground over the path 2BZ and now closed 8MP1 and 4MP1 contacts. The P1 relay releases with the removal of the ground from the P1 relay as the contact 20 opens as the cam rotates further to complete the revolution and as the cam contact 55 traverses the Z–W–X operation of the cam surface. The released P1 relay does not release the W relay at this time because of the self-locking path over the 6MW contact between the voltage source 48 and the ground 53 made during the first half of the revolution. The Z relay operates because the shunt on itself is now removed as the 8MP1 and 4MP1 contacts open thus providing an operating path over the 47 and now closed 6MW contact between the voltage source and the ground. The Z cycle follows the W cycle. The P1 relay operates again as the P1 cam rotates on its second revolution and the P1 cam contact 33 traverses the cam surface X–Y–Z again. The operated P1 relay releases the W relay as now closed 4MP1, 8MP1, and 2MZ contacts shunt the voltage source from the W relay. The Z relay remains operated over the path 47 6BW and closed 4MP1 contacts between the voltage source and the ground. The P1 relay releases again as the cam further rotates to complete the second revolution and the cam contact 33 traverses the Z–W–X surface again. The released P1 relay releases the Z relay by removing the ground from the relay as the 4MP1 contact opens. The W and Z relays are now back to the normal released state and ready to repeat the cycle as the P1 cam continues to rotate. The following remarks will demonstrate additional advantages of the invention as hereinbefore described.

Since sequences in each deck have recurrent pattens, then the failure to extract a card or insert during any given cycle will have a high probability of detection. This may be illustrated by the following examples.

TABLE I

| Cycle | 1 | 2 | 3 | 4 | 5 |
|---|---|---|---|---|---|
| Indicia on cards. Extracted from first deck | 11 | 01 | 10 | 11 | |
| Indicia on cards. Extracted from second deck | | 11 | 01 | 10 | 11 |

TABLE II

| Cycle | 1 | 2 | 3 | 4 | 5 | 6 | 7 | 8 | 9 |
|---|---|---|---|---|---|---|---|---|---|
| Indicia on cards. Extracted from first deck | 11 | 01 | 10 | 11* | 01* | 10 | 11* | 01 | 10 |
| Indicia on cards. Extracted from second deck | | 11 | 01 | 10 | 10 | 01 | 11 | | |

Tables I and II show the recurrent pattern of indicia of the inserts or cards extracted during successive machine cycles. For purposes of this discussion, 0 will represent the no-hole condition and the 1 will represent the hole condition. It will be noticed in both tables that the cards extracted from the second deck are one cycle displaced with the cards extracted from the first deck. Table I represents the usual comparison condition where there is a correspondence between inserts in their respective sequences. Table II represents the same situation except for a noncorrespondence between inserts from the first deck drawn in the fourth and sixth cycles with inserts drawn from the second deck in the fifth and seventh cycles. Obviously, if the code capacity used to identify the indicia were increased then a higher noncorrespondence would occur if there was a failure to extract inserts. This may be seen, for example, in Table III.

TABLE III

| Cycle | 1 | 2 | 3 | 4 | 5 | 6 | 7 |
|---|---|---|---|---|---|---|---|
| Indicia on cards. Extracted from first deck | | 001* | 010* | 011* | 100 | 101* | 001 |
| Indicia on cards. Extracted from second deck | | | 001* | 111* | 111* | 11 1 | |

In Table III a three position hole or no-hole combination is used to identify each insert. It will be noted, that the recurrent pattern starts on the first cycle and repeats on the sixth cycle. Should the extracting means fail to draw cards for the second reading station as, for example, in the third, fourth, and fifth cycles, then, as previously mentioned, the indicia would be represented by 111. Since 111 is not used to identify any insert there would immediately result a signal indicative of noncorrespondence and the machine would stop on each and every cycle under these circumstances.

Since certain further changes can be made in the foregoing construction, and different embodiments of the invention can be made without departure from the spirit and scope thereof, it is intended that all matter shown in the accompanying drawings and described herebefore shall be interpreted as illustrative only.

What is claimed is:

1. In a multi-cycle envelope insert stuffing machine having a conveyor belt, the combination comprising means for supporting at least a first and a second stacked deck of inserts disposed about the belt, the inserts of each deck being arranged in predetermined sequence with recurrent patterns of indicia, the sequence of the first deck being at least one insert displaced with respect to the sequence of the second deck, means for extracting individual inserts from the decks during each cycle, means for sensing the indicia identifying each of the inserts as they are extracted from their respective decks, a first circuit for storing the sensed indicia of an insert extracted from the second deck during any given cycle, a second circuit for storing the sensed indicia of an insert extracted from the first deck during a cycle immediately preceding any given cycle, a third circuit coupling the first and second circuits for generating a signal indicative of unlike stored sensed indicia, a machine interrupt circuit responsive to the signal, and means for sychronizing the cyclic operation of the conveyor belt, the extracting means and the first, second, and third circuits.

2. In a multi-cycle envelope insert stuffing machine-having a conveyor belt, the combination comprising means for supporting at least a first and a second stacked deck of inserts disposed about the conveyor belt, the inserts of each deck being arranged in predetermined sequence with recurrent patterns of indicia, the first deck sequence being at least one insert out of phase with the second deck sequence, means for extracting the bottom insert from each deck during each cycle, means for sensing the indicia identifying each of the inserts as they are extracted from their respective decks, the sensing means having a grounding plate, at least a first and a second plurality of brushes in contact relation with the grounding plate and interruptable in response to the coded indicia on the inserts as said inserts are drawn between the brushes and the plate, the combination further comprising a first circuit for storing the sensed indicia of an insert extracted from the second deck during any given cycle, a second circuit for storing the sensed indicia of an insert extracted from the first deck during a cycle immediately preceding any given cycle, a third circuit coupling the first and second circuits for generating a signal indicative of unlike stored sensed indicia, a machine interrupts circuit responsive to the signal, and means for synchronizing the cyclic operation of the conveyor belt, the extracting means, and the first, second, and third circuits.

3. In a multi-cycle envelope insert stuffing machine having a conveyor belt, the combination comprising means for supporting at least a first and a second stacked deck of inserts disposed about the belt, the inserts of each deck being arranged in predetermined sequence with recurrent patterns of indicia, the first deck sequence being at least one insert out of phase with the second deck sequence, means for extracting the bottom insert from each deck during each cycle, means for sensing the indicia identifying each of the inserts as they are extracted from their respective decks, a first and a second cross-connected plurality of relays coupling the sensing means, each plurality of relays operable on alternate cycles storing the sensed indicia of an insert extracted from the second deck during a given cycle with insensed indicia of an insert extracted from the first deck during a cycle immediately preceding the given cycle, a comparator coupling the first and second relay pluralities for generating a signal indicative of unlike stored sensed indicia in either relay plurality, a machine interrupt circuit responsive to the signal, and means for synchronizing the cyclic operation of the conveyor belt, the extracting means, and the first and second relay pluralities.

4. In a multi-cycle envelope insert stuffing machine having a unidirectionally moving conveyor belt, means for supporting at least a first and a second stacked deck of inserts disposed about the longitudinal extent of the belt, the inserts of each deck being arranged in predetermined sequence with recurrent patterns of hole and no-hole combinations coded thereon, the first deck sequence being one insert out of phase with the second deck sequence, means for simultaneously extracting the bottom insert from each deck during each cycle, means for sensing the hole and no-hole combination identifying each insert as they are extracted from their respective decks, the sensing means having a grounding plate, a first and a second plurality of brushes in contact relation with the grounding plate and interruptable in response to the hole-no-hole combinations on the inserts as said inserts are drawn between the brushes and the plates, a first and a second cross-connected plurality of relays coupling the pluralities of brushes, each plurality of relays alternately storing the brush grounding plate response caused by the hole-no-hole combinations of an insert extracted from the first deck during any given cycle with the brush grounding plate response caused by the hole-no-hole combinations of an insert extracted from the second deck during a cycle immediately preceding any given cycle, a comparison circuit coupling the pluralities of relays for generating a signal indicative of unlike stored sensed hole-no-hole combinations of either relay plurality, a machine interrupt circuit responsive to the signal, and means for synchronizing the cyclic operation of the conveyor belt, the extracting means, and the first and second relay pluralities, the synchronizing means having a pair of cams, and a first and second switch included within the energization paths of the relay pluralities, which switches are alternately actuated by the cams.

5. An improved envelope insert stuffing machine of the type wherein indicia carrying inserts are cyclically extracted from two separate stacks of inserts to form pairs, and the indicia on each insert withdrawn from the first stack is compared with the indicia carried on the insert withdrawn from the second stack during the next succeeding cycle of extraction, wherein the improvement comprises:
   first means for sensing the indicia on each insert extracted from the first stack of inserts;
   means for storing information indicative of the indicia sensed by said first means;
   second means for sensing the indicia on each insert extracted from the second stack of inserts;
   means for comparing the indicia sensed by said second sensing means with the information stored by said storing means during the previous cycle of extraction and producing an output signal if the information fails to correspond; and
   means responsive to said output signal for stopping the machine.

6. In a system for comparing bits of information stored on a first group of storing mediums with bits of information stored on a second group of storing mediums;
   a first information storage facility;
   first means for sensing each bit of information on each successive first storing medium, and successively operating said first storage facilities to store each successive bit of information;
   a pair of second information storage facilities;
   second means for sensing each bit of information on each successive second storing medium and storing each successive bit of information alternately on one of said pair of storage facilities; and means for comparing alternately each bit of information stored in one of said pair of storage facilities with successive bits of information stored in said first storage facilities, and producing an output signal upon ascertaining a noncomparison of bits of said stored information.

References Cited

UNITED STATES PATENTS 2,660,372  11/1953  Leclerc  235—61.7
2,661,841  12/1953  Wallace  209—110

DARYL W. COOK, Primary Examiner.

U.S. Cl. X.R.

209—110